United States Patent
Weng et al.

(10) Patent No.: US 12,519,690 B2
(45) Date of Patent: Jan. 6, 2026

(54) MANAGEMENT DEVICE AND SLAVE DEVICE IN NETWORK SYSTEM AND METHOD PERFORMED BY THE SAME

(71) Applicant: TP-LINK CORPORATION LIMITED, Hong Kong (CN)

(72) Inventors: Kaiping Weng, Chengdu (CN); Canjie Chen, Chengdu (CN)

(73) Assignee: TP-LINK CORPORATION LIMITED, Hong Kong (CN)

( * ) Notice: Subject to any disclaimer, the term of this patent is extended or adjusted under 35 U.S.C. 154(b) by 0 days.

(21) Appl. No.: 18/650,869

(22) Filed: Apr. 30, 2024

(65) Prior Publication Data

US 2024/0283699 A1  Aug. 22, 2024

Related U.S. Application Data

(63) Continuation of application No. PCT/CN2022/134710, filed on Nov. 28, 2022.

(51) Int. Cl.
*H04L 12/28* (2006.01)
*H04L 41/0803* (2022.01)
(Continued)

(52) U.S. Cl.
CPC ...... *H04L 41/0803* (2013.01); *H04L 41/0893* (2013.01); *H04L 12/281* (2013.01); *H04L 41/0668* (2013.01); *H04L 41/0853* (2013.01)

(58) Field of Classification Search
CPC ....... H04W 88/16; H04W 4/70; H04W 84/20; H04L 12/66; H04L 12/281;
(Continued)

(56) References Cited

U.S. PATENT DOCUMENTS

| 8,971,173 B1* | 3/2015 | Choudhury | H04L 41/0816 370/219 |
| 2012/0296999 A1* | 11/2012 | Kuo | H04L 12/2803 709/206 |

(Continued)

FOREIGN PATENT DOCUMENTS

| CN | 110609746 A | 12/2019 |
| CN | 113542022 A | 10/2021 |

OTHER PUBLICATIONS

International Search Report for PCTCN2022134710, and English Translation dated Aug. 9, 2023.

(Continued)

*Primary Examiner* — Tom Y Chang
(74) *Attorney, Agent, or Firm* — Loeb & Loeb LLP

(57) ABSTRACT

The present disclosure relates to a management device in a network system. The network system includes at least one slave device. The management device is communicatively connected with the at least one slave device. The management device includes a memory, and a processor communicatively coupled with the memory and configured to: receive, from one or more slave devices of the at least one slave device, function information of functions supported by the one or more slave devices; summarize the received function information and function information of functions supported by the network system which is stored in the management device; determine function information of the summarized function information, a function corresponding to which a control device is to be determined for; and determine the control device for the function to which the determined function information corresponds, from the management device and the at least one slave device.

20 Claims, 6 Drawing Sheets

(51) Int. Cl.
*H04L 41/0893* (2022.01)
*H04L 41/0668* (2022.01)
*H04L 41/0853* (2022.01)

(58) Field of Classification Search
CPC ............. H04L 12/2809; H04L 12/2818; H04L 41/0668; H04L 41/0853
See application file for complete search history.

(56) References Cited

U.S. PATENT DOCUMENTS

2015/0188724 A1* 7/2015 Kim ..................... H04N 7/181
340/3.71
2020/0112454 A1   4/2020 Brown
2021/0165379 A1* 6/2021 Yang ................... G05B 19/042

OTHER PUBLICATIONS

Extended European Search Report issued in App. No. EP22962267, dated Oct. 10, 2024, 10 pages.

* cited by examiner

MANAGEMENT DEVICE AND SLAVE DEVICE IN NETWORK SYSTEM AND METHOD PERFORMED BY THE SAME

This application is a continuation of International Patent Application No. PCT/CN2022/134710, filed on Nov. 28, 2022 and titled "MANAGEMENT DEVICE AND SLAVE DEVICE IN NETWORK SYSTEM AND METHOD PERFORMED BY THE SAME".

The aforementioned patent application is incorporated herein their entirety by reference.

TECHNICAL FIELD

The present disclosure relates to the field of communication, particularly to a network system in which functions are distributed, and a management device and a slave device in the network system and a method performed by the same.

BACKGROUND

Wireless communication network systems are widely deployed to provide various types of communication content such as voice, video, packet data, messaging, broadcast, and so on. As the content of communication continues to be abundant, there are increasing demands on the communication by people, such as higher rates, lower latencies, and the like. Network systems including devices such as gateway devices may facilitate wireless communications and are increasingly widely used in environments such as homes, offices, and factories, etc. With the development of technology, functions of electronic devices (i.e., network devices) in a network system are constantly enriched, so that there are electronic devices supporting different sets of functions in the network system, i.e., a network system in which functions are distributed. Therefore, there is a need to completely manage all functions in a network system in which functions are constantly rich (e.g., a network system in which functions are distributed).

SUMMARY

Based on the above, the present disclosure provides a network system, a management device and other electronic devices (e.g., slave devices) in the network system and a method performed by the same.

In an aspect of the present disclosure, the present disclosure provides a management device in a network system comprising at least one slave device, the management device communicatively connected with the at least one slave device, the management device comprising: a memory, and a processor communicatively coupled with the memory and configured to: receive, from one or more slave devices of the at least one slave device, function information of functions that the one or more slave devices support; summarize the received function information and function information of functions supported by the network system which is stored in the management device; determine function information of the summarized function information, a function corresponding to which a control device is to be determined for; and determine the control device for the function to which the determined function information corresponds from the management device and the at least one slave device.

In another aspect of the present disclosure, the present disclosure provides an electronic device in a network system, the electronic device comprising: a memory, and a processor communicatively coupled with the memory and configured to: transmit, in response to a predetermined trigger condition, function information of functions supported by the electronic device; and activate configurations for one or more functions of the functions to control the one or more functions, in response to receiving an instruction specifying the electronic device as a control device for the one or more functions.

In yet another aspect of the present disclosure, the present disclosure provides a method performed by a management device in a network system, the network system including at least one slave device, the management device being communicatively connected with the at least one slave device, the method comprising: receiving, from one or more slave devices of the at least one slave device, function information of functions that the one or more slave devices support; summarizing the received function information and function information of functions supported by the network system which is stored in the management device; determining function information of the summarized function information, a function corresponding to which a control device is to be determined for; and determining the control device for the function to which the determined function information corresponds from the management device and the at least one slave device.

In yet another aspect of the present disclosure, the present disclosure provides a method performed by an electronic device in a network system, the method comprising: transmitting function information of functions supported by the electronic device in response to a predetermined trigger condition; activating configurations for one or more functions of the functions to control the one or more functions, in response to receiving an instruction specifying the electronic device as a control device for the one or more functions.

In addition, the present disclosure also provides a management device in a network system, the network system including at least one slave device, the management device being communicatively connected with the at least one slave device, the management device comprising: a receiving module, configured to receive, from one or more slave devices of the at least one slave device, function information of functions supported by the one or more slave devices; a summarizing module, configured to summarize the received function information and function information of functions supported by the network system which is stored in the management device; and a determining module, configured to determine function information of the summarized function information, a function corresponding to which a control device is to be determined for, and determine the control device for the function to which the determined function information corresponds, from the management device and the at least one slave device.

The present disclosure also provides an electronic device in a network system, the electronic device comprising: a transmitting module, configured to transmit function information of functions supported by the electronic device; a receiving module, configured to receive an instruction specifying the electronic device as a control device for one or more functions of the functions; and a controlling module, configured to activate configuration for the one or more functions to control the one or more functions.

The present disclosure also provides a network system including the management device and an electronic device as described above, the electronic device being a slave device in the network system, and the management device being communicatively connected with the slave device.

The present disclosure also provides a non-transitory computer readable storage medium storing instructions that, when executed by a processor, cause the processor to perform the method performed by the management device in the network system according to the present disclosure.

The present disclosure also provides a non-transitory computer readable storage medium storing instructions that, when executed by a processor, cause the processor to perform the method performed by an electronic device (e.g., a slave device) in a network system according to the present disclosure.

The details of one or more examples are set forth in the accompanying drawings and the description below. Other features, objects, and advantages will be apparent from the description, drawings, and claims.

BRIEF DESCRIPTION OF DRAWINGS

The above as well as other objects, features and advantages of the present disclosure will become more apparent from the following more detailed description of embodiments thereof taken in conjunction with the accompanying drawings. The accompanying drawings are used to provide a further understanding of embodiments of the present disclosure, and constitute a part of the specification. The drawings together with the embodiments of the present disclosure are used to explain the present disclosure, but do not constitute a limitation of the present disclosure. In the drawings, like reference numerals refer to like means, steps or elements, unless expressly indicated otherwise. In the drawings.

DETAILED DESCRIPTION

Figure 1:
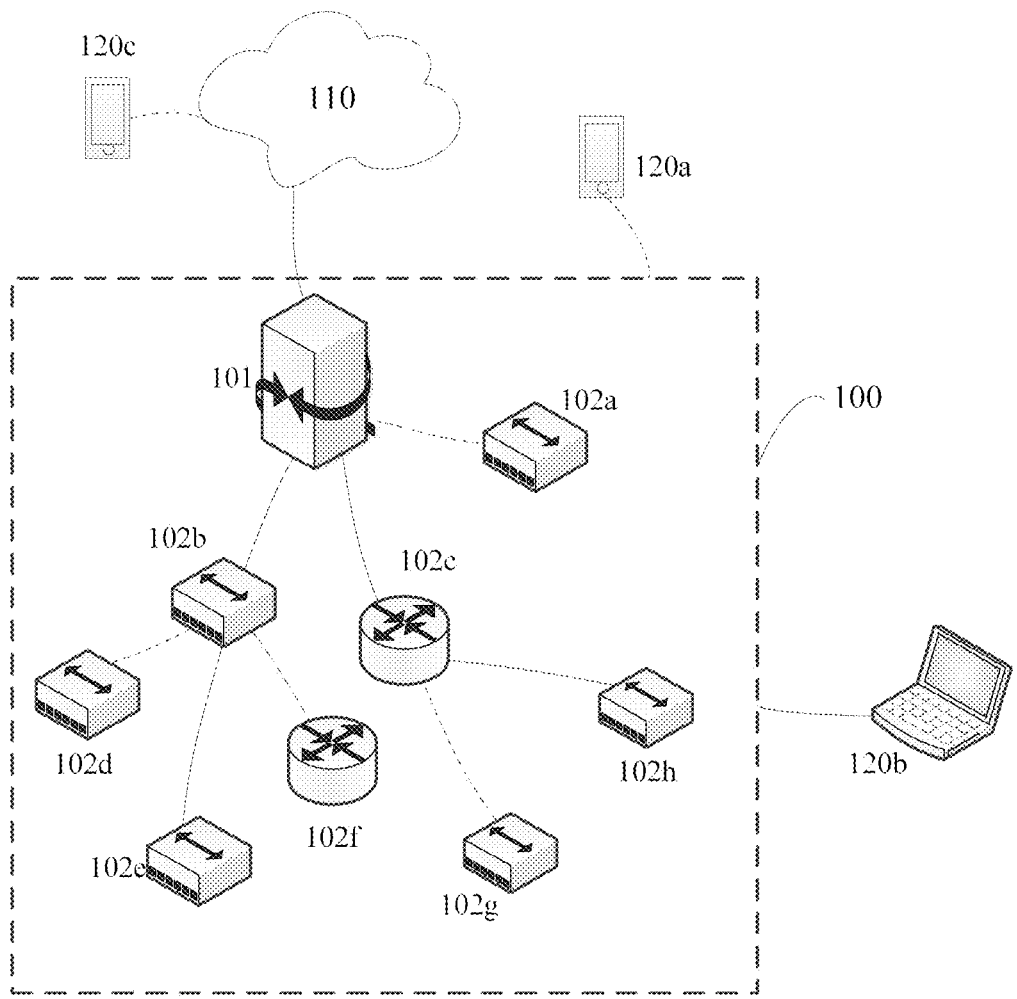
FIG. 1 illustrates an example network system according to an embodiment of the present disclosure.

A clear and complete description will be made below on the technical solutions of the present disclosure in conjunction with the accompanying drawings. Apparently, the described embodiments are part of the embodiments of the present disclosure, rather than all of the embodiments. Based on the embodiments in the present disclosure, all other embodiments obtained by those of ordinary skill in the art without making creative labor, belong to the protection scope of the present disclosure.

In the description of the present disclosure, it is to be noted that an orientation or positional relationship indicated by terms "center," "upper," "lower," "left," "right," "vertical," "horizontal," "inner," "outer," and the like are an orientation or positional relationship shown based on the drawings, which is only for convenience of describing the present disclosure and simplifying the description, and do not indicate or imply that the referred apparatus or element must have a particular orientation, be constructed and operate in a particular orientation, and thus are not to be construed as limiting the present disclosure. Moreover, terms "first," "second," and "third" are used for descriptive purposes only and are not to be understood as indicating or implying relative importance. Likewise, terms such as "a," "an," "the," and the like do not denote a limitation of quantity, but rather denote the presence of at least one. Terms such as "comprising" or "including" and the like means that the elements or items preceding the terms encompass the elements or items and equivalents thereof listed after the terms, but does not exclude other elements or items. Terms such as "connect," "connected," or "coupled" and the like are not restricted to physical or mechanical connections, but can include electrical connections, whether direct or indirect.

In the description of the present disclosure, it should be noted that terms "mounted", "connect", "connected" or "coupled" are to be understood broadly unless expressly specified and limited otherwise. For example, it may be fixedly connected, removably connected, or integrally connected; be mechanical or electrical connections; be direct or indirect through an intermediate medium, or be internal connectivity in the two elements. The specific meanings of the above terms in the present disclosure can be understood in specific cases to those of ordinary skill in the art.

Further, technical features involved in different implementations of the present disclosure described below may be combined with each other as long as they do not conflict with each other.

In conventional management of a network system including, for example, a gateway device, all functions in the entire network system are managed by the gateway device. However, the functions that can be supported by the entire network system will increase rapidly, for example, since the electronic devices in the network system can support different sets of functions (i.e., a network system in which the functions are distributed). As the network system supports more and more functions, this way of managing all functions in the entire network system by the gateway device may be difficult to manage effectively. For example, in a network system in which the sets of functions supported by respective electronic devices in the network system are excessively different or in which distributed devices are richer in function than the gateway device, there are cases in which part of the functions cannot be used or the functions are simplified. For another example, the processing capabilities of the gateway device may not be able to efficiently handle signaling related to managing all functions in the network system. Therefore, there is a need to fully and efficiently express and manage all functions in a network system (e.g., a network system in which functions are distributed) in which functions are constantly rich. Based on this, the present disclosure provides a network system, as well as a management device and other electronic devices (e.g., slave devices) in the network system, and a method performed by the same, which can enable full and efficient expression and management of all functions in the network system in which functions are constantly rich.

FIG. 1 illustrates an example network system 100, according to an embodiment of the present disclosure. As shown in FIG. 1, the network system 100 may comprise a management device 101 for managing the network system 100 and slave devices 102a-102h. As an example, the management device 101 may be a gateway device, a router, or an access point, among others. The slave devices 102a-102h may be, for example, wireless expanders. A wireless extender according to an embodiment of the present disclosure may also serve as a management device. Of course, a gateway device, a router, an access point, or the like may also serve as a slave device in the network system 100. The management device 101 and the slave devices 102a-102h may be communicatively connected in various ways, such as by one or more wireless links (e.g., as shown by dashed lines in FIG. 1), one or more wired links (e.g., as shown by solid lines in FIG. 1), or any combination thereof.

The network system 100 may be connected with another network 110 (e.g., the Internet) through the management device 101. End-user devices, e.g., end-user devices 120a and 120b shown in FIG. 1, may connect with network system 100, and in turn may connect with another network 110 (e.g., the Internet) through network system 100, thereby accessing another network 110 (e.g., the Internet). Further, an end-user device, e.g., end-user device 120c shown in FIG. 1, may connect with another network 110 (e.g., the Internet), and in turn may connect with network system 100 through network 110, thereby accessing and controlling network system 100. End-users may control the network system 100 through end-user devices (e.g., end-user devices 120a and 120b shown in FIG. 1) via, for example, an APP or browser, such as among others, configuring, querying, and/or instructing the operation of functions supported the management device 101 and one or more of the slave devices 102a-102h in the network system 100. Further, in a case where an end-user device (e.g., end-user device 120c shown in FIG. 1) is connected with network system 100 through network 110, the end-user may also remotely control network system 100 through the end-user device. End-user devices 120a-120c may be any personal electronic device, such as a cellular phone, a personal digital assistant (PDA), a tablet computer, a laptop computer, or a personal computer, among others.

Figure 2:
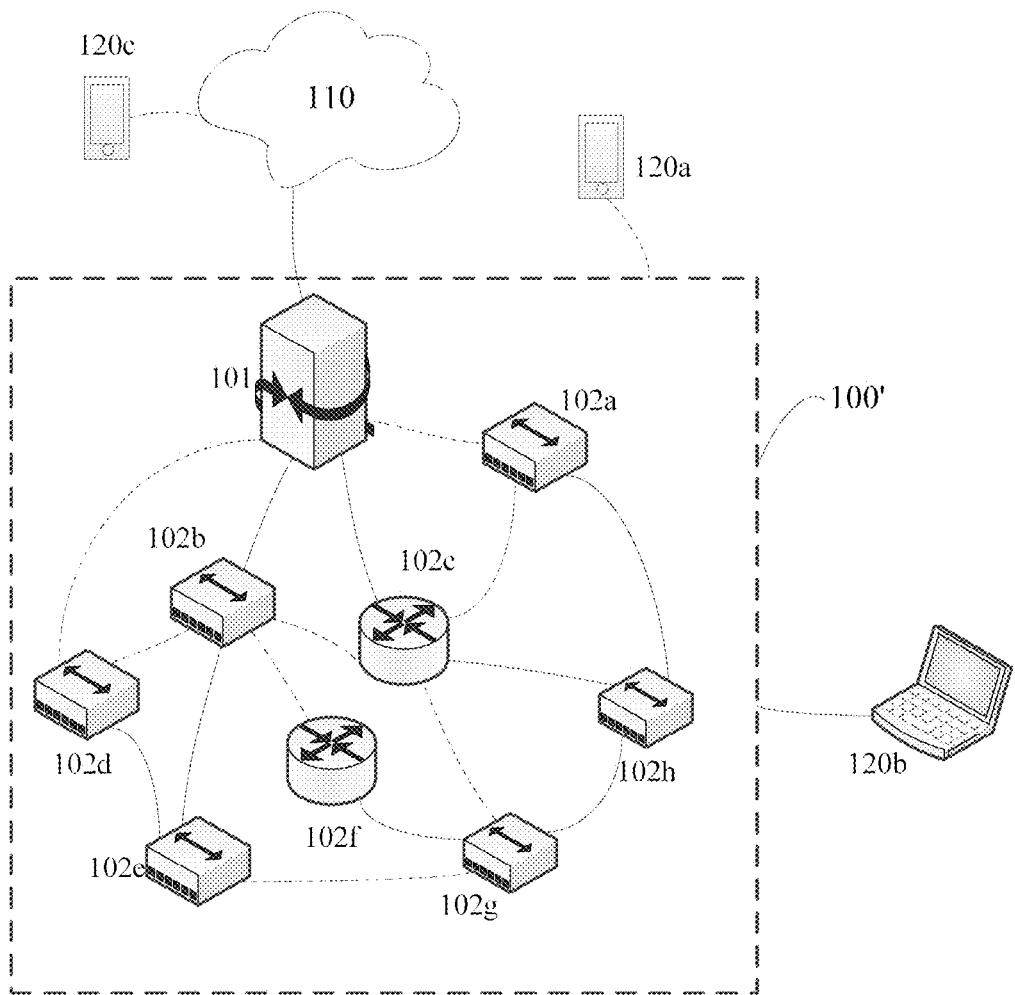
FIG. 2 illustrates another example network system according to an embodiment of the present disclosure.

FIG. 2 illustrates another example network system according to an embodiment of the present disclosure. The network system 100' shown in FIG. 2 is substantially the same as the network system 100 shown in FIG. 1, except that the management device 101 and the slave devices 102a-102h can be interconnected with each other in addition to single link connections shown in FIG. 1, such that the slave devices can be connected to the management device via a plurality of links, forming, for example, the mesh topology shown in FIG. 2.

Hereinafter, for brevity, one or more of the slave devices 102a-102h shown in FIGS. 1 and 2 may be represented by the slave device 102, and one or more of the end-user devices 120a-120c shown in FIGS. 1 and 2 may be represented by the end-user device 120. Further, it should be understood that FIGS. 1 and 2 are merely examples of a network system according to an embodiment of the present disclosure, and not limitations. The types and numbers of the management device 101, the slave device 102, and the end-user device 120 and the manner of connection shown in FIGS. 1 and 2 are merely examples and not limitations. For example, a network system according to an embodiment of the present disclosure may comprise different types of the management devices 101 and the slave devices 102, and/or may comprise more or less slave devices 102. For another example, the wireless connections shown in FIGS. 1 and 2, which are represented by dashed lines, may be replaced with wired connections, and vice versa. Yet for another example, the management device 101 and the slave device 102 may be interconnected via various intermediary devices (e.g., switches) in addition to being connected as shown in FIGS. 1 and 2. For example, the slave device 102c may be connected to the management device 101 via a switch (not shown). In the present disclosure, the connection means may comprise a plurality of connection means such as a wireless connection, a wired connection, and a power line connection.

The management device 101 and the slave device 102 in the network system 100 according to embodiments of the present disclosure may support different sets of functions. In the present disclosure, as an example, the different sets of functions may comprise, for example, different functions and different versions of the same function. For example, the management device 101 may support 3 functions of a network system management (version 1), a master network (version 1), and a guest network (version 2), the slave devices 102a-102d may support 4 functions of the network system management (version 1), the master network (version 1), the guest network (version 2), and an IoT (Internet of Things) functions, and the slave devices 102e-102h may support 3 functions of the network system management (version 1), the master network (version 2), and the guest network (version 2). In this case, the management device 101, the slave devices 102a-102d, and the slave devices 102e-102h support different sets of functions. The electronic devices (e.g., the management device 101 and the slave device 102 shown in FIGS. 1 and 2) in the network system may increase the supported functions through firmware upgrades, which may increase the functions supported by the network system without changing the hardware of the electronic devices in the network system.

Figure 3:
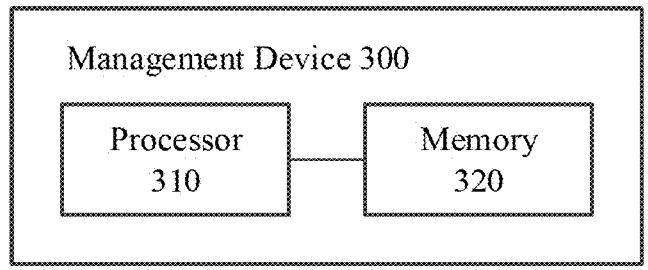
FIG. 3 illustrates an example management device in a network system, according to an embodiment of the present disclosure.

FIG. 3 illustrates an example management device 300 in a network system, according to an embodiment of the present disclosure. The example management device 300 shown in FIG. 3 may be, for example, the management device 101 shown in FIGS. 1 and 2. As shown in FIG. 3, the management device 300 may comprise a processor 310 and a memory 320 communicatively coupled thereto. Processor 310 may comprise an intelligent hardware device, e.g., a general-purpose processor, a DSP, a central processing unit (CPU), a microcontroller, an ASIC, an FPGA, a programmable logic device, a discrete gate or transistor logic component, a discrete hardware component, etc., or any combination thereof. The memory 320 may comprise random access memory (RAM) and read-only memory (ROM), among others. The processor 310 may be configured to perform the method described in conjunction with FIG. 4. The memory 320 may store instructions that, when executed by the processor 310, may cause the processor 310 to perform the method described in conjunction with FIG. 4. It should be understood that the management device 300 shown in FIG. 3 may also include other components, such as a transceiver or the like.

Figure 4:
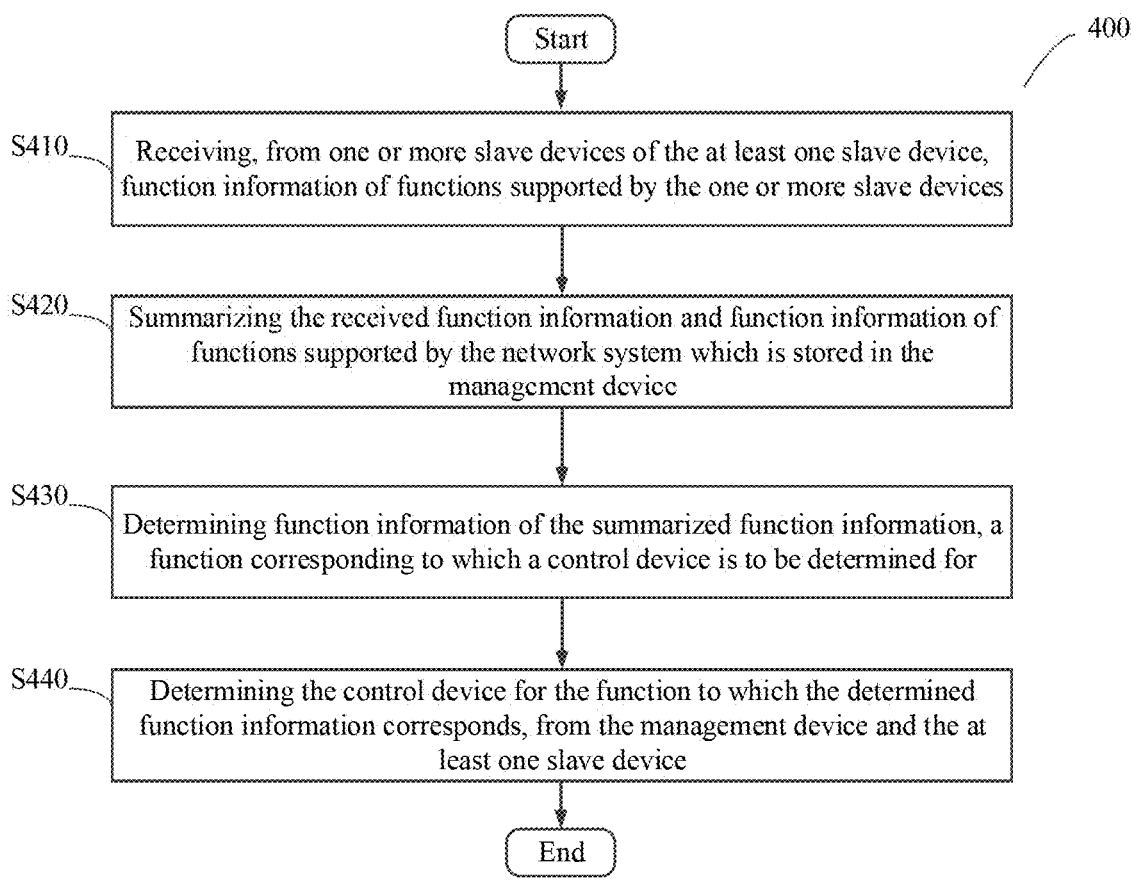
FIG. 4 illustrates an example method performed by a management device in a network system, according to an embodiment of the present disclosure.

FIG. 4 illustrates an example method 400 performed by a management device in a network system, according to an embodiment of the present disclosure. The method illustrated in FIG. 4 may be performed by a management device (e.g., the management device 101 illustrated in FIGS. 1 and 2 and the management device 300 illustrated in FIG. 3) according to an embodiment of the present disclosure. As shown in FIG. 4, the method 400 performed by a management device in a network system according to an embodiment of the present disclosure starts from step S410.

At step S410, the management device (e.g., the management device 101 shown in FIGS. 1 and 2 and the management device 300 shown in FIG. 3) in the network system receives, from at least one slave device (e.g., the slave device 102 shown in FIGS. 1 and 2), function information of their supported functions. Exemplarily, the slave device may proactively transmit the function information of its supported functions to the management device when accessing the network system. Alternatively, the slave device may transmit the function information of its supported functions to the management device in response to a transmission request of the management device. In one embodiment, the management device may receive, from all slave devices in the network system, function information of their supported functions, for example, when the network system is initially set up. As another example, when one or more slave devices in the network system go offline, function information of their supported functions may be received from each of the remaining slave devices in the network system. In another embodiment, the function information of their supported functions may be received from only some of the slave devices in the network system. For example, when new slave devices access an existing network system (i.e., including the management device and at least one slave device), the function information of their supported functions may be received only from the newly accessed slave devices. For another example, the function information of their supported functions may be received only from slave devices whose set of functions is different from that of the management device. For yet another example, in a case where the network system includes a slave device that does not have the ability to transmit the function information, the function information may be received only from the slave devices that have the ability to transmit the function information.

The function information may comprise any information related to the function. For example, the function information may comprise at least one of the name of the function (with a version number), attribute information, an instruction list, and configuration information, and the like. The attribute of the function may define factors that affect the presentation of the function. For example, a read-write attribute may define whether a function supports modification; the operating mode attribute may define that a function takes effect when the management device or the slave device supporting that function is in a particular operating mode; the node attribute may define that a function can only take effect on the gateway device; and the collaboration attribute may define the type or number of collaboration devices required for the function. In one embodiment of the present disclosure, the attributes may be classified into the static attribute, the semi-static attribute, and the dynamic attribute, etc. The static attribute may be an attribute defining that the presentation of the function is not affected by the network system (e.g., the operating mode of the electronic devices in the network system and the type or number of the electronic devices in the network system, etc.). For example, the read-write attribute and the node attribute, etc., as described above. The semi-static attribute may be an attribute defining that the presentation of the function is affected by the architecture of the network system (e.g., the type or number of the electronic devices in the network system, etc.), but not affected by the operating mode of the electronic devices in the network system, for example, the collaboration attribute as described above. The dynamic attribute may define an attribute that the presentation of the function is affected by the operating mode of the electronic device in the network system, for example, the operating mode attribute as described above. In one embodiment of the present disclosure, the slave may refer to the attribute information of the function to determine whether to transmit the function information of that function. For example, the slave device may determine whether to transmit the function information of the function based on the static attribute (e.g., the node attribute). For example, if a node attribute of function A defines that the function A can only take effect on the gateway device, the slave device may determine not to transmit the function information of the function A to the management device based on the node attribute. Of course, it is also possible to determine whether a slave device transmits function information of a certain function based on other attributes (e.g., the semi-static attribute and the dynamic attribute described above). The instruction list may comprise a configuration and/or information presentation interface that the function provides to the end-user. The configuration information may comprise the configuration required for the function to actually take effect, which may be predefined or modified by the end-user in some way, e.g. modified by the end-user device via an APP or browser.

At step S420, the management device may summarize the received function information and function information of functions supported by the network system, which is stored in the management device. Exemplarily, when the network system is initially set up, the management device may summarize the received function information and function information of functions supported by the management device itself. In this case, the function information of the functions supported by the network system, which is stored in the management device, may be the function information of the functions supported by the management device itself. For another example, when a new slave device accesses an existing network system, the management device may summarize the received function information and the function information of the functions supported by the existing network system that the management device previously summarized. In this case, the function information of the functions supported by the network system which is stored in the management device may be the function information of the functions supported by the network system previously, that is previously summarized by the management device. The summarization may comprise consolidating the received function information. For example, when there are different versions of the same function, the high version may be retained and the low version can be removed, wherein the high version may be compatible with the low version. Of course, the summarization may also not perform a consolidating operation on the received function information, e.g., retaining both the high and low versions when there are different versions of the same function.

At step S430, the management device may determine function information of the summarized function information, a function corresponding to which a control device is to be determined for. In one embodiment, it may be determined that the control devices are determined for functions corresponding to all summarized function information, for example, when the network system is initially set up, and yet for example, when one or more slave devices in the network system go offline. In another embodiment, it may be determined that the control device is determined for the function corresponding to the received function information, for example, when a new slave device accesses the existing network system. In yet another embodiment, determining the function information of the summarized function information, the function corresponding to which the control device is to be determined for, may comprise: determining the function information of the summarized function information that is different from the function information of the functions supported by the network system, which is stored in the management device, and determining that the control device is determined for the function corresponding to the different function information. Note that step S430 is not essential, and the control device may be determined for all function information or the received function information by default. For example, in an embodiment where it is determined that the control devices are determined for the functions corresponding to all the summarized function information and the method 400 is implemented by software, code for performing the determining step may not be required.

At step S440, the management device may determine the control device for the function to which the determined function information corresponds, from the management device and at least one slave device (e.g., the management device 101 and the slave devices 102a-102h shown in FIGS. 1 and 2). The division of the function set to which the summarized function information corresponds can be achieved by determining the control device for the function, thereby dividing the function set supported by the network system into a plurality of subsets, and determining the control devices for each function subset. The control device may actually control the effect of the function.

In one embodiment, determining the control device may comprise: determining at least one device available for controlling the function from the management device and the at least one slave device; and selecting the control device for the function from the at least one device based on a predetermined rule. Illustratively, the predetermined rule may comprise at least one of the following: the management device first, a slave device with the least number of hops from the management device first, a slave device with the highest link rate to the management device first, a device with the least current load first, a device with the highest main processor performance first, a device with the largest memory space first, and a device with the smallest or largest physical address first.

For example, in one embodiment, the predetermined rule may be a combination of one or more of the rules described above. Exemplarily, a combination of the device with the least current load first and the device with the smallest or largest physical address first is taken as an example. The control devices for the function may be first selected from the at least one device based on the device with the least current load first. In this way, a plurality of devices may be selected, since there may be the plurality of devices with the same and minimal load in the at least one device. In this case, the control device may be selected from the plurality of devices based on the device with the smallest or largest physical address first, thereby selecting a unique control device. By selecting the control device for the function from at least one device available for controlling the function based on the combined rule of the device with the least current load first and the device with the smallest or largest physical address first, it can be guaranteed that a unique control device is selected while achieving load balancing of the function within the network system. Similarly, the combination of the device with the highest main processor performance first or the device with the largest memory space first and the device with the smallest or largest physical address first may also guarantee that the unique control device is selected while achieving the load balancing of the function within the network system. It should be understood that other rule combinations are possible as long as the rules are not mutually exclusive.

Further, as described above, the function information may comprise attribute information of the function. In this case, from the management device and the at least one slave device, determining the control device for the function may be based on attribute information of the function. For example, the control device for the function may be determined based on the semi-static property described above. Exemplarily, assuming that the collaboration attribute of function B defines that the function B requires at least 3 downstream devices to collaborate and that the at least three downstream devices are in direct communication with a device that controls the function B, the control device for the function B may be determined to be a device (e.g., the slave device 102b in FIG. 1) that has at least 3 downstream devices in direct communication therewith. It is of course also possible to determine the control device for the function on the basis of the static and dynamic properties.

Further, after determining the control device for the function to which the determined function information corresponds (i.e., step S440), it may be determined whether the network system supports the function for the end-user based on the attribute information (i.e., the attribute) of the function. In one embodiment, whether the network system supports a certain function for an end-user may be determined based on the dynamic attribute described above (e.g., the operating mode attribute described above). For example, assuming that the operating mode attribute of function C defines that the function C takes effect when the management device is in operating mode A, if the management device is not in the operating mode A, the function C may be hidden from the end-user. That is, it is determined that the network system does not support the function C for the end-user. In this case, when the end-user queries the functions supported by the network system through the end-user device, the function C is not included in the query result. In this way, the network system may be enabled to present functions to the end-user that are truly in effect without including functions that are not in effect. Of course, it is also possible to determine whether the network system supports a certain function for an end-user based on other attributes (e.g., the static attribute and the semi-static attribute described above).

Further, after determining the control device for the function to which the determined function information corresponds, the management device may map an instruction list of the function to the control device. Thereafter, the management device may receive the function-related instruction transmitted by the end-user device, and in response to receiving the instruction, transmit an instruction to the control device based on the mapping of the instruction list for the function to the control device. The control device may perform an operation corresponding to the instruction.

Further, as described above, the function information may comprise configuration information of the function. In this case, the management device may transmit a set of configuration information to each of the at least one slave device. The set of configuration information may comprise configuration information of all functions supported by the network system, which is summarized by the management device.

In addition to the management device 300 in the network system including the processor 310 and the memory 320 shown in FIG. 3. The present disclosure also provides a management device in a network system, the network system including at least one slave device, the management device being communicatively connected with the at least one slave device, the management device comprising: a receiving module, configured to receive, from one or more slave devices of the at least one slave device, function information of functions supported by the one or more slave devices; a summarizing module, configured to summarize the received function information and function information of functions supported by the network system which is stored in the management device; and a determining module, configured to determine function information of the summarized function information, a function corresponding to which a control device is to be determined for, and to determine a control device for the function to which the determined function information corresponds, from the management device and the at least one slave device. The various modules in the management device (e.g., the receiving module, the summarizing module, and the determining module) may also perform the method described above in conjunction with FIG. 4. Furthermore, the present disclosure also provides a non-transitory computer readable storage medium storing instructions that, when executed by a processor, cause the processor to perform the method performed by a management device in a network system according to the present disclosure, such as the method described above in conjunction with FIG. 4.

A network system, a management device in the network system and a method performed by the same according to embodiments of the present disclosure are described above in conjunction with FIGS. 1-4. The network system, the management device, and the method performed by the same can express and manage all functions of the network system completely and efficiently, so that it can be the complete set of functions of the system that is presented to the user to control, thereby allowing the user to use any one function of the network system, and breaking the limitation that the management device to manage all functions of the network system (e.g., the network system in which functions are distributed as described above), it is difficult to express all functions of the network system. Compared to the management device controlling all the functions supported by the network system, the slave device in the network system can actually control the effect of its supported functions as the control device for the functions, which can reduce the load of the processing resources of the management device (e.g., resources such as the CPU and the memory of the management device), and realize the load balancing of the function of the network system. Further, since a control device may be determined for a function controlled by a slave device that has been offline or supported by an online slave device when one or more slave devices are online (e.g., access to a network) or offline (e.g., leave a network), the network system, the management device, and the method performed by the same according to the embodiment of the present disclosure may perform adaptive modulation and dynamic migration of a control device for a function when a slave device is online and offline. In addition, by the slave device in the network system transmitting the function information to the management device based on the attribute information of the function (e.g., the static attribute described above), the management device determining the control device for the function based on the attribute information of the function (e.g., the semi-static attribute described above), and/or the management device determining whether the network system supports the function for the end-user based on the attribute information of the function (e.g., the dynamic attribute described above), the signaling load for the function information communication can be reduced and the network system is better managed while fully and efficiently expressing and managing all functions in the network system.

In the above, the present disclosure describes a management device in a network system and a method performed by the same according to an embodiment of the present disclosure in conjunction with FIGS. 3 and 4. Hereinafter, the present disclosure will describe other electronic devices in the network system (e.g., the slave device 102 shown in FIGS. 1 and 2) and methods performed by the same in conjunction with FIGS. 5-7.

Figure 5:
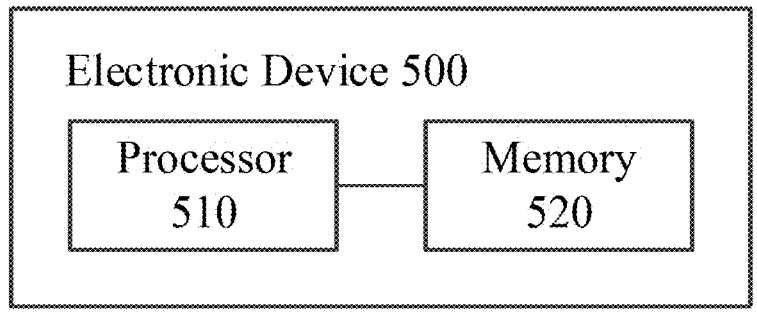
FIG. 5 illustrates an example electronic device in a network system according to an embodiment of the present disclosure.

FIG. 5 illustrates an example electronic device 500 in a network system, according to an embodiment of the present disclosure. The electronic device 500 may be the slave device 102 shown in FIGS. 1 and 2. The example electronic device 500 shown in FIG. 5 may comprise a processor 510 and a memory 520 communicatively coupled thereto. Processor 510 may comprise an intelligent hardware device, e.g., a general-purpose processor, a DSP, a central processing unit (CPU), a microcontroller, an ASIC, an FPGA, a programmable logic device, a discrete gate or transistor logic component, a discrete hardware component, etc., or any combination thereof. The memory 520 may comprise random access memory (RAM) and read-only memory (ROM), among others. The processor 510 may be configured to perform the methods described in conjunction with FIGS. 6 and 7. The memory 520 may store instructions that, when executed by the processor 510, may cause the processor 510 to perform the methods described in conjunction with FIGS. 6 and 7. It should be understood that the electronic device 500 shown in FIG. 5 may also include other components, such as a transceiver or the like.

Figure 6:
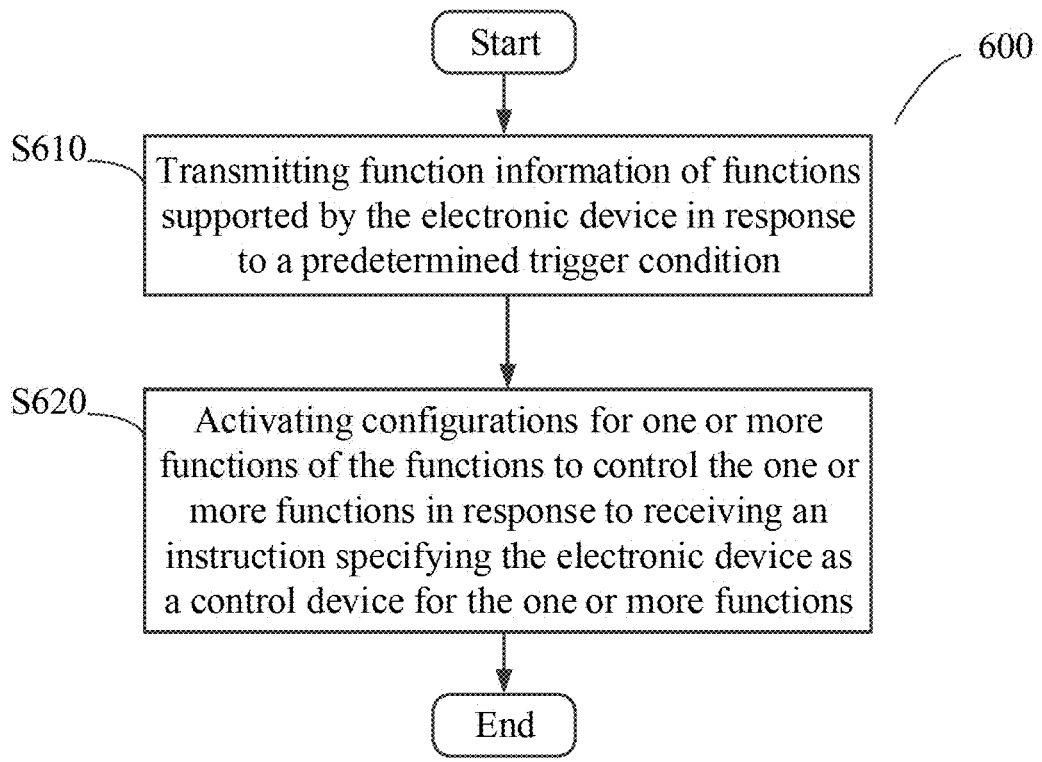
FIG. 6 illustrates an example method performed by an electronic device in a network system, according to an embodiment of the present disclosure.

FIG. 6 illustrates an example method 600 performed by an electronic device in a network system, according to an embodiment of the present disclosure. The method illustrated in FIG. 6 may be performed by an electronic device (e.g., the slave device 102 illustrated in FIGS. 1 and 2 and the electronic device 500 illustrated in FIG. 5) according to an embodiment of the present disclosure. As shown in FIG. 6, the method 600 performed by the electronic device in the network system according to an embodiment of the present disclosure may start from step S610.

At step S610, the electronic device (e.g., the slave device 102 shown in FIGS. 1 and 2 or the electronic device 500 shown in FIG. 5) in the network system may transmit function information of its supported functions in response to a predetermined trigger condition. For example, the function information of its supported functions may be transmitted to a management device (e.g., the management device 101 shown in FIGS. 1 and 2) in the network system. Step S610 may occur when the electronic device accesses the network, for example, when the network system is initially set up or when the electronic device accesses an existing network system. Alternatively, this step may occur when one or more electronic devices in the network system leave the network system. Exemplarily, the predetermined trigger condition may comprise, for example, the electronic device accessing the network system or the electronic device receiving a request to transmit the function information. Specifically, the electronic device may proactively transmit function information of its supported functions to the management device when accessing the network system. Alternatively, the electronic device may transmit the function information to the management device in response to receiving a request transmitted by the management device.

As described above, the function information may comprise any information related to the function. For example, the function information may comprise at least one of the name of the function (with a version number), attribute information, an instruction list, and configuration information, and the like. In a case where the function information includes the attribute information, transmitting the function information of the functions supported by the electronic device may comprise: based on the attribute information of the functions, determining whether to transmit the function information; and in response to determining to transmit the function information, transmitting the function information. In one embodiment, whether to transmit the function information may be determined based on the static attribute information described above. It is of course also possible to determine whether to transmit the function information based on the semi-static attribute information and the dynamic attribute information. By determining whether to transmit the function information based on the attribute information, a signaling load for the function information communication may be reduced.

At step S620, the electronic device in the network system, in response to receiving an instruction specifying it as a control device for one or more functions of functions that the electronic device supports, activates a configuration for the one or more functions to control the one or more functions. In one embodiment, the one or more functions may be all functions supported by the electronic device, for example, in a case where the functions supported by the electronic device are supported only thereby. In another embodiment, the one or more functions may be part of all functions supported by the electronic device, for example, where there are multiple electronic devices in the network system supporting the functions supported by the electronic device. In this case, the electronic device may further receive an instruction, transmitted by the management device in the network system in response to other electronic devices in the network system being offline, specifying the electronic device to control one or more functions that are controlled by the offline other electronic devices, and in response to receiving the instruction, activate configuration for the one or more functions to control the one or more functions. In this way, the dynamic migration of a control device for a function can be achieved when an electronic device in the network system goes offline.

In implementing control of the one or more functions, the method may comprise: receiving an instruction related to the one or more functions; and based on the received instruction, performing an operation to which the instruction corresponds. The instruction may be transmitted by the management device in the network system based on a mapping of the instruction list of the one or more functions to the electronic device, as described above.

After being determined as a control device for a certain function, the control device may receive an instruction to modify its configuration, modify its configuration information based on the instruction, and transmit the modified configuration information to the management device in the network system. The management device may receive the latest configuration information of functions controlled by each electronic device in the network system from each electronic device, summarize the received configuration information, and transmit a set of the summarized configuration information (i.e., the set of configuration information including the configuration information of all functions supported by the network system that the management device summarizes) to other electronic devices in the network system other than the management device itself. Accordingly, other electronic devices in the network system may receive the set of configuration information.

Figure 7:
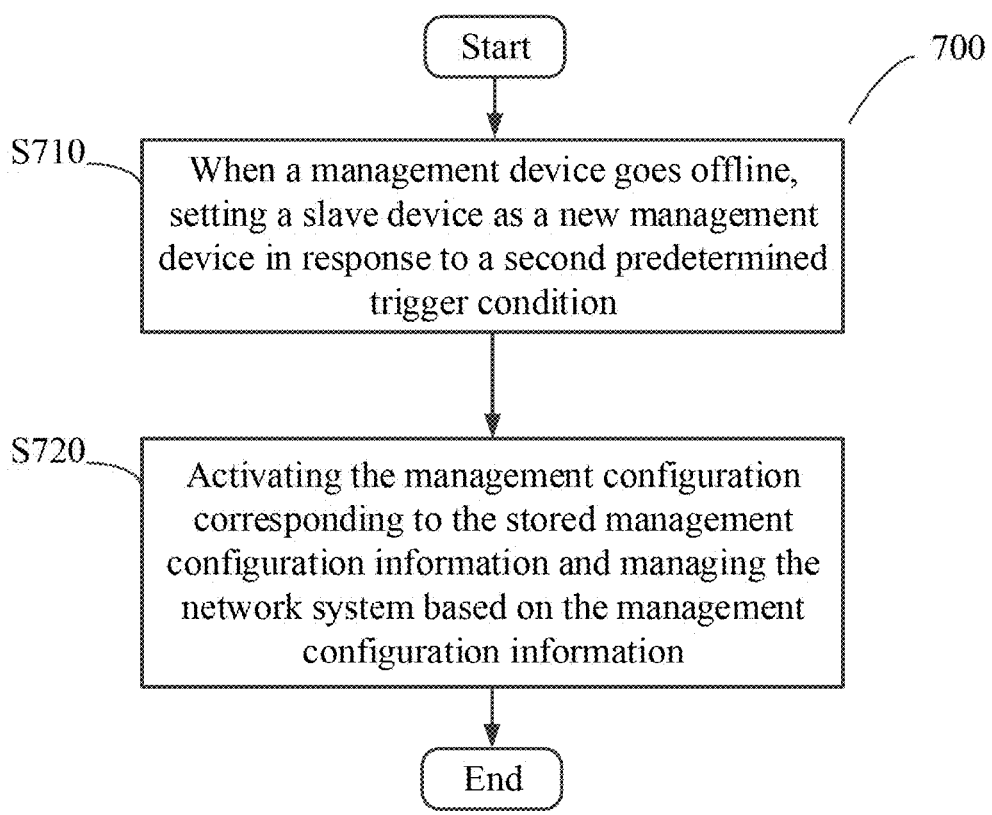
FIG. 7 illustrates another example method performed by an electronic device in a network system according to an embodiment of the present disclosure.

An example method performed by an electronic device in a network system according to an embodiment of the present disclosure is described above in conjunction with FIG. 6. By this method, the electronic device in the network system can act as a control device for the functions that it supports to actually control the effect of the functions, which can reduce the load on the processing resources of the management device (e.g., resources such as the CPU and memory of the management device), and achieve the load balancing of functions within the network system. Further, by performing the method described in conjunction with FIG. 6 when an electronic device in a network system is offline, the dynamic migration of a control device for a function may be achieved. The dynamic migration of the control device for the function in combination with the electronic device receiving the set of configuration information of all functions supported by the network system can guarantee continuity of function performance, making the user perceive no difference in function performance. This is because each electronic device receives an up-to-date set of configuration information of all functions supported by the network system, and thus it is possible, when designated as a new control device for a function, to retrieve the up-to-date configuration for the function (which may be modified via a previous control device) directly from the set of configuration information, and to control the function based on the up-to-date configuration. Hereinafter, the present disclosure will describe another example method 700 performed by an electronic device in a network system according to an embodiment of the present disclosure in conjunction with FIG. 7. As shown in FIG. 7, the method 700 may begin with step S710.

At step S710, when a management device in the network system goes offline (e.g., when the management device fails), a certain electronic device in the network system may set itself as a new management device in response to a predetermined trigger condition. At step S720, the electronic device as the new management device activates the management configuration corresponding to the stored management configuration information and manages the network system based on the management configuration information. In one embodiment, the predetermined trigger condition may be the electronic device accessing an external network system (e.g., the network 110 shown in FIGS. 1 and 2). In this case, when the electronic device accesses the external network system, it automatically sets itself as the new management device. In another embodiment, the predetermined trigger condition may be the electronic device receiving an indication designating it as the new management device. In this case, when the electronic device accesses the external network system, it does not automatically set itself as the new management device, but sets itself as the new management device after receiving the indication designating it as the new management device. The indication may be transmitted by the end-user via an end-user device (e.g., the end-user device 120 shown in FIGS. 1 and 2). In this way, the dynamic migration of the management device can be achieved when the management device in the network system is offline, further guaranteeing continuity of functional performance.

In addition to the electronic device 500 in the network system including the processor 510 and the memory 520 shown in FIG. 5. The present disclosure also provides an electronic device in a network system, the electronic device comprising: a transmitting module, configured to transmit function information of functions supported by the electronic device; a receiving module, configured to receive an instruction specifying the electronic device as a control device for one or more functions of the functions that the electronic device supports; and a controlling module, configured to activate configurations for the one or more functions to control the one or more functions. The various modules in the electronic device (e.g., the receiving module and the controlling module, etc.) may also perform the methods described above in conjunction with FIGS. 6 and 7. In addition, the present disclosure also provides a non-transitory computer readable storage medium storing instructions that, when executed by a processor, cause the processor to perform the method performed by an electronic device in a network system according to the present disclosure, such as the methods described above in conjunction with FIGS. 6 and 7.

Figure 8:
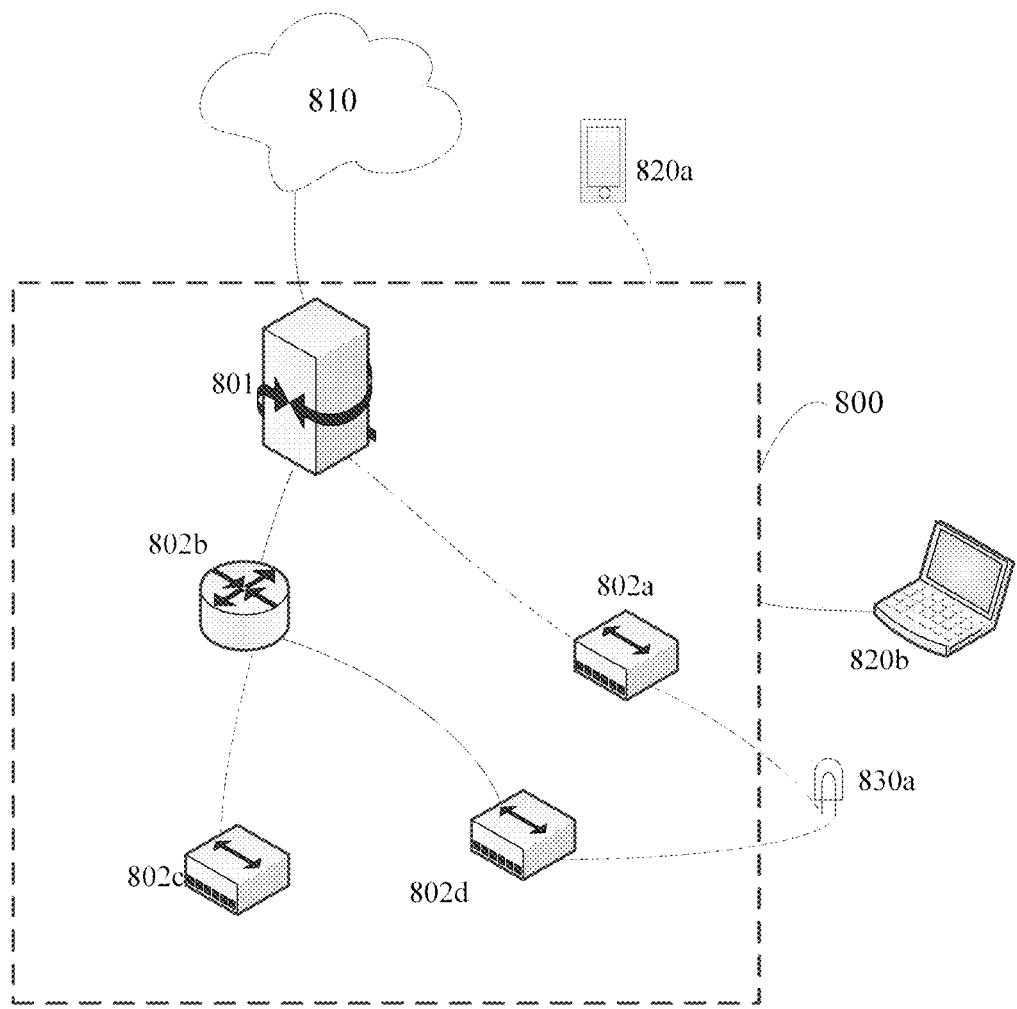
FIG. 8 is a schematic diagram for explaining an example function control by a network system according to an embodiment of the present disclosure.

In the above, the present disclosure describes a network system, a management device and an electronic device in the network system, and a method performed by the same, according to an embodiment of the present disclosure, in conjunction with FIGS. 1-7. In order for those skilled in the art to better understand the present disclosure, hereinafter, the present disclosure will give an example of function control by the network system according to an embodiment of the present disclosure in conjunction with FIG. 8. It should be understood that the function control described below in conjunction with FIG. 8 is merely an example to illustrate the present disclosure, but not limitations. This example may comprise more or fewer features than those described above, and there is no requirement that an implementation according to the disclosure necessarily includes all of the features that this example includes.

Similar to FIG. 1, the example network system 800 shown in FIG. 8 may comprise a management device 801 for managing the network system 800 and other electronic devices 802*a*-802*d* (i.e., slave devices). The management device 801 and the slave devices 802*a*-802*d* may be communicatively connected via networks 803*a* and 803*b*. The slave devices 802*a* and 802*d* are IoT enabled, which can control IoT device-lamp 830*a* through networks 803*c* and 803*d*, respectively. The network system 800 may be connected with another network system 810 (e.g., the Internet) through the management device 801. End-user devices 820*a* and 820*b* can connect with the network system 800, and in turn can connect with another network system 810 through the network system 800 (e.g., via the management device 801), thereby accessing another network system 810. The end-user may configure, query, and/or instruct the operation of the functions supported by one or more of the management device 801 and the slave devices 802*a*-802*d* via the APP or browser through the end-user devices 820*a* and 820*b*.

It is assumed that the management device 801 can support 3 functions, [network system management (version 1), master network (version 1), guest network (version 2)], function information corresponding to which is [network system management (version 1) information, master network (version 1) information, guest network (version 2) information]; the slave devices 802*a*-802*c* may support 3 functions, [network system management (version 1), master network (version 2), IoT function (version 2)], function information corresponding to which is [network system management (version 1) information, master network (version 2) information, IoT function (version 2) information]; the slave device 802*d* may support 3 functions, [network system management (version 1), guest network (version 2), IoT function (version 2)], function information corresponding to which is [network system management (version 1) information, guest network (version 2) information, IoT function (version 2) information].

When the network system 800 is just set up, the slave devices 802*a*-802*d* may transmit function information of their supported functions to the management device 801. The management device 801, after receiving the function information transmitted from the slave devices 802*a*-802*d*, may summarize the received function information and function information of the functions supported by the network system which is stored in the management device 801 (in this example, the function information of the functions supported by the management device 801, i.e., [network system management (version 1) information, master network (version 1) information, guest network (version 2) information]) by consolidating (i.e., deleting the same function information, and when there are different versions of the same function, retaining the high version, and removing the low version). In this way, the summarized function information is [network system management (version 1) information, master network (version 2) information, guest network (version 2) information, IoT function (version 2) information].

After that, the management device 801 may determine a control device for a function to which each summarized function information corresponds. Assuming that the management device 801 determines that the control device for the network system management (version 1) is the management device 801, the control device for the master network (version 2) is the slave device 802*b*, the control device for the guest network (version 2) is the slave device 802*d*, and the control device of the IoT function (version 2) is the slave device 802*a*, after the management device 801 determines the control devices for the functions corresponding to the respective summarized function information, the management device 801 may transmit instructions to the slave device 802*b*, the slave device 802*d*, and the slave device 802*a*, respectively, instructing them to be control devices of the master network (version 2), the guest network (version 2), and the IoT function (version 2), respectively. The slave device 802*b*, the slave device 802*d*, and the slave device 802*a*, after receiving the instruction, may activate the configuration for the corresponding function to control the corresponding function.

After the control devices are determined for the network system management (version 1), master network (version 2), guest network (version 2), and IoT functions (version 2) supported by the network system 800, the management device 801 may map instruction lists of the respective functions to the respective control devices. The end-user may then control (e.g., modify the configuration or operate the function) the functions supported by the network system 800 via the APP or browser through the end-user device 820*a* or 820*b*.

Specifically, assuming that the end-user wants to light up the IoT device-lamp 830*a* at 8 o'clock per day, the end-user may transmit a corresponding instruction to the management device 801 via the APP through, for example, the end-user device 830*a*. Upon receiving the instruction, unlike a conventional network system in which the management device 801 itself controls the execution of the instruction (e.g., transmitting a command to the slave device connected to the lamp 830 instructing it to light up the lamp 830 at 8 o'clock per day), the management device 801 transmits the instruction to the slave device 802*a* based on the mapping of the instruction to the slave device 802*a*. Then, lighting up the lamp 830a at 8 o'clock per day is controlled by the slave device 802a by modifying the configuration associated with controlling lamp 830a to light up.

Afterward, the slave device 802a may transmit the modified configuration information to the management device 801. The management device 801 may summarize this modified configuration and the already stored configuration information of the functions supported by the network system, and then transmit a set of summarized configurations to all slave devices in the network system, i.e., the slave devices 802a-802d. Alternatively, the management device 801 may transmit the set of summarized configurations to all slave devices in the network system except the slave device 802a, i.e., slave devices 802b-802d.

After a period of time, assuming that the slave device 802a controlling the lamp 830a goes offline (e.g., has failed), the slave device 802d with IoT function (version 2) may be selected as the new control device for the IoT function (version 2) by the determination of the control device for the function described above, thereby controlling the lighting up of the lamp 830a. Further, since the slave device 802d has stored the set of configurations that includes the configuration for controlling the lamp 830a to light up at 8 o'clock per day, the new control device for the IoT function (version 2)—the slave device 802d—can fetch the configuration for the IoT function from the set of configurations to control the lamp 830a to light up at 8 o'clock per day, without the user terminal transmitting an instruction specifying the lamp 830a to light up at 8 o'clock per day. This guarantees continuity of functional performance (i.e., lighting up the lamp 830a at 8 o'clock per day).

So far, the present disclosure has described a network system, a management device and an electronic device (i.e., a slave device) in the network system and a method performed by the same, according to embodiments of the present disclosure, in conjunction with the accompanying drawings. The network system, the management device, the electronic device, and the method performed by the same can express and manage all functions of the network system completely and efficiently, so that any one function of the network system can be used, breaking the limitation that the management device to manage all functions of the network system (e.g., the network system in which functions are distributed as described above), it is difficult to express all functions of the network system. Furthermore, the network system, the management device, the electronic device, and the method performed by the same, can enable the dynamic migration of the management device and/or the control device when the management device is offline and the electronic device is offline or online, thereby adapting to the addition and removal of nodes in the network system and changes in the network topology. This dynamic migration, in conjunction with the electronic device receiving a set of configuration information of all functions supported by the network system, can enable continuity in the performance of the same function before and after changes in a salve device being offline, and switching a new management device, etc., and enable the user to perceive no difference in the performance of the functions.

It should be noted that the above description is only some embodiments of the present disclosure and illustrative of the principles of the applied technology. It should be understood by those skilled in the art that the scope of the disclosure involved in the present disclosure is not limited to the technical solution formed by the specific combination of the above technical features, but also covers other technical solutions formed by any combination of the above technical features or their equivalent features without departing from the concept of the above disclosure, for example, the technical solutions formed by replacing the above features with (but not limited to) technical features with similar functions to those disclosed in this disclosure.

Further, while operations are depicted in a particular order, this should not be understood as requiring that these operations be performed in the particular order or in the sequential order shown. In certain circumstances, multitasking and parallel processing may be advantageous. Likewise, while several specific implementation details are contained in the above discussion, these should not be construed as limitations to the scope of the present disclosure. Certain features that are described in the context of a single embodiment can also be implemented in combination in the single embodiment. Conversely, various features that are described in the context of a single embodiment can also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are merely example forms of implementing the claims.

The invention claimed is:

1. A management device in a network system, the network system comprising at least one slave device, the management device communicatively connected with the at least one slave device, the management device comprising:
   a memory, and
   a processor communicatively coupled with the memory and configured to:
      receive, from one or more slave devices of the at least one slave device, function information of functions supported by the one or more slave devices, wherein the function information comprises function-related information obtained by increasing the functions supported by the slave device via a firmware upgrade of the slave device;
      summarize the received function information and function information of functions supported by the network system which is stored in the management device, by consolidating the received function information and the function information of functions supported by the network system so that a high version of a function is retained and a low version of the function is removed;
      determine function information of the summarized function information, a function corresponding to which a control device is to be determined for, comprising: determining a different function information from the function information which is stored in the management device among the summarized function information, as the function information corresponding to the function to which the control device is to be determined for; and
      determine the control device for the function to which the determined function information corresponds, from the management device and the at least one slave device, comprising: determining the slave device from which the different function information is received as the control device for the function of the different function information,
   wherein the processor is further configured to:

transmit a set of configuration information to each of the at least one slave device, and wherein the set of configuration information includes the configuration information of all functions supported by the network system which is summarized by the management device, and wherein the configuration information describes how the function takes effect.

2. The management device of claim 1, wherein, determining the control device for the function to which the determined function information corresponds, from the management device and the at least one slave device, comprises:

determining at least one device available for controlling the function from the management device and the at least one slave device; and selecting the control device for the function from the at least one device based on a predetermined rule.

3. The management device of claim 2, wherein the predetermined rule comprises at least one of:

the management device first, a slave device with the least number of hops from the management device first, a slave device with the highest link rate to the management device first, a device with the least current load first, a device with the highest main processor performance first, a device with the largest memory space first, or a device with the smallest or largest physical address first.

4. The management device of claim 1, wherein the function information includes attribute information of the function, and wherein the determining the control device for the function to which the determined function information corresponds, from the management device and the at least one slave device, comprises:

determining the control device for the function, from the management device and the at least one slave device, based on the attribute information of the function.

5. The management device of claim 1, wherein the function information includes attribute information of the function, and wherein the processor is further configured to:

determine whether the network system supports the function for an end-user based on the attribute information that the determined function information includes, after determining the control device for the function to which the determined function information corresponds.

6. The management device of claim 1, wherein the processor is further configured to:

map an instruction list of the function to the control device, after determining the control device for the function to which the determined function information corresponds; and transmit the instruction to the control device based on a mapping of the instruction list of the function to the control device, in response to receiving an instruction related to the function.

7. The management device of claim 1, wherein the processor is further configured to:

receive, from each of remaining slave devices of the at least one slave device, the function information of its supported functions, when one or more slave devices of the at least one slave device are offline;

summarize the received function information and function information of functions supported by the management device; and determine the control device for the function to which each function information of the summarized function information corresponds, from the management device and the remaining slave devices.

8. An electronic device in a network system, the electronic device comprising:

a memory, and a processor communicatively coupled with the memory and configured to:

transmit function information of functions supported by the electronic device in response to a predetermined trigger condition, to a management device, wherein the function information comprises function-related information obtained by increasing the functions supported by the electronic device via a firmware upgrade of the electronic device; and activate configurations for one or more functions of the functions to control the one or more functions in response to receiving an instruction specifying the electronic device as a control device for the one or more functions, wherein function information of the one or more functions is different from function information which is previously stored in the management device, wherein the processor is further configured to:

receive a set of configuration information, and wherein the set of configuration information includes the configuration information of all functions supported by the network system which is summarized by the management device in the network system, and wherein the configuration information describes how the function takes effect.

9. The electronic device of claim 8, wherein the predetermined trigger condition comprises: the electronic device accessing the network system, or the electronic device receiving a request to transmit the function information.

10. The electronic device of claim 8, wherein the function information includes attribute information of the function, and wherein transmitting the function information of the functions supported by the electronic device comprises:

determining whether to transmit the function information, based on the attribute information of the functions supported by the electronic device; and transmitting the function information in response to determining to transmit the function information.

11. The electronic device of claim 8, wherein the processor is further configured to:

receive an instruction related to the one or more functions; and perform an operation corresponding to the instruction based on the received instruction, wherein the instruction is transmitted by the management device in the network system based on a mapping of an instruction list of the one or more functions to the electronic device.

12. The electronic device of claim 8, wherein the electronic device is a slave device in the network system, wherein the network system further comprises the management device which is communicatively connected with the slave device, wherein the memory stores management configuration information of the management device managing the network system, and wherein the processor is further configured to:

set the electronic device as a new management device in response to a second predetermined trigger condition when the management device is offline, activate a management configuration corresponding to the stored management configuration information and manage the network system based on the management configuration information.

13. The electronic device of claim 12, wherein the second trigger condition includes the electronic device accessing an external network system, or the electronic device receiving an indication designating the electronic device as the new management device.

14. The electronic device of claim 8, wherein the electronic device is a slave device in the network system, wherein the network system further comprises the management device which is communicatively connected with the slave device, and wherein the processor is further configured to:
  receive an instruction specifying that the electronic device controls one or more functions, transmitted by the management device in response to another slave device in the network system being offline; and
  activate configuration for the one or more functions to control the one or more functions in response to receiving the instruction,
  wherein the one or more functions are functions that the another slave device controls.

15. A method performed by a management device in a network system, the network system including at least one slave device, the management device communicatively connected with the at least one slave device, the method comprising:
  receiving, from one or more slave devices of the at least one slave device, function information of functions supported by the one or more slave devices, wherein the function information comprises function-related information obtained by increasing the functions supported by the slave device via a firmware upgrade of the slave device;
  summarizing the received function information and function information of functions supported by the network system which is stored in the management device, by consolidating the received function information and the function information of functions supported by the network system so that a high version of a function is retained and a low version of the function is removed;
  determining function information of the summarized function information, a function corresponding to which a control device is to be determined for, comprising: determining a different function information from the function information which is stored in the management device among the summarized function information, as the function information corresponding to the function to which the control device is to be determined for; and
  determining the control device for the function to which the determined function information corresponds, from the management device and the at least one slave device, comprising: determining the slave device from which the different function information is received as the control device for the function of the different function information,
  wherein the method further comprises:
  transmitting a set of configuration information to each of the at least one slave device, and
  wherein the set of configuration information includes the configuration information of all functions supported by the network system which is summarized by the management device, and wherein the configuration information describes how the function takes effect.

16. The method of claim 15, wherein the function information includes attribute information of the function, and wherein determining the control device for the function to which the determined function information corresponds, from the management device and the at least one slave device comprises:
  determining the control device for the function, from the management device and the at least one slave device, based on the attribute information of the function.

17. The method of claim 15, wherein the function information includes attribute information of the function, the method further comprising:
  determining whether the network system supports the function for an end-user based on the attribute information that the determined function information includes, after determining the control device for the function to which the determined function information corresponds.

18. The method of claim 15, further comprising:
  receiving, from each of remaining slave devices of the at least one slave device, the function information of its supported functions, when one or more slave devices of the at least one slave device are offline;
  summarizing the received function information and function information of functions supported by the management device; and
  determining the control device for the function to which each function information of the summarized function information corresponds, from the management device and the remaining slave devices.

19. The method of claim 15, wherein, determining the control device for the function to which the determined function information corresponds, from the management device and the at least one slave device, comprises:
  determining at least one device available for controlling the function from the management device and the at least one slave device; and
  selecting the control device for the function from the at least one device based on a predetermined rule.

20. The method of claim 15, the method further comprising:
  mapping an instruction list of the function to the control device, after determining the control device for the function to which the determined function information corresponds; and
  transmitting the instruction to the control device based on a mapping of the instruction list of the function to the control device, in response to receiving an instruction related to the function.

* * * * *